United States Patent [19]

Koike et al.

[11] 4,246,392

[45] Jan. 20, 1981

[54] METHOD FOR THE PREPARATION OF POLYURETHANE ELASTOMERS BASED ON POLYETHYLENEGLYCOL-BIS(4-AMINOBENZOATES)

[75] Inventors: Wataro Koike, Shizuoka; Masami Takayama, Shimizu; Hideaki Ohashi, Fujieda; Chihiro Yazawa, Yokohama, all of Japan

[73] Assignee: Ihara Chemical Industry Co., Ltd., Tokyo, Japan

[21] Appl. No.: 950,385

[22] Filed: Oct. 11, 1978

[30] Foreign Application Priority Data

Dec. 9, 1977 [JP] Japan ................................. 52/147876

[51] Int. Cl.³ ...................... C08G 18/32; C08G 18/10; C07C 101/62

[52] U.S. Cl. ................................. 528/64; 528/76; 560/50

[58] Field of Search ..................... 528/64, 76

[56] References Cited

U.S. PATENT DOCUMENTS

| 3,036,996 | 5/1962 | Kogon | 528/64 |
|---|---|---|---|
| 3,681,290 | 8/1972 | Meckel | 528/64 |
| 3,932,360 | 1/1976 | Cerankowski et al. | 528/64 |

*Primary Examiner*—H. S. Cockeram
*Attorney, Agent, or Firm*—William J. Daniel

[57] ABSTRACT

A method for the preparation of polyurethane elastomers in which polyethyleneglycol-bis(4-aminobenzoate) is used as the curing agent to be admixed with the polyurethane formulations. This curing agent imparts considerably extended pot life to the ready-prepared polyurethane composition to be cured by heating into an elastomer having improved properties.

4 Claims, No Drawings

METHOD FOR THE PREPARATION OF POLYURETHANE ELASTOMERS BASED ON POLYETHYLENEGLYCOL-BIS(4-AMINOBENZOATES)

BACKGROUND OF THE INVENTION

The present invention relates to a novel method for the preparation of polyurethane elastomers by use of an aromatic diamine compound as the curing agent. In particular, the invention relates to a method for the preparation of polyurethane elastomers by use of a polyethyleneglycol-bis(4-aminobenzoate) as the curing agent.

It is well known that polyurethane elastomers are usually prepared by the reaction of a polyisocyanate and a polyol admixed with a curing agent or by the reaction of a curing agent with a liquid polyurethane prepolymer having isocyanate groups at the chain ends prepared in advance by the reaction of a polyol and an excessive amount of a polyisocyanate.

As a consequence of expanded application fields of polyurethane polymers in recent years, there is a growing demand for large quantities of polyurethane-based materials to be used for making large-sized shaped articles of polyurethane elastomers, for water-proofing in civil engineering and building construction, as pavement materials with elasticity, as sealing materials and the like. When a polyurethane composition is to be used in these applications, it is an essential requirement that the ready-prepared composition obtained by the admixture of the curing agent have a sufficiently long pot life in order to facilitate smooth casting or coating with the composition to give products or coating of uniform quality over a given work time. Some of the examples of the conventional curing agents are aromatic diamine compounds such as 4,4'-methylene-bis(2-chloroaniline), 3,3'-dichlorobenzidine and the like, of which the first mentioned compound is widely employed since excellent polyurethane elastomers with a high hardness and elasticity as well as good abrasion resistance are obtained with this curing agent.

The problem with 4,4'-methylene-bis(2-chloroaniline) is that the polyurethane composition when admixed with this curing agent has a rather short pot life leading to insufficient workability for fabrication of large articles or mass use in civil engineering or building construction.

In order to overcome this defect of 4,4'-methylene-bis(2-chloroaniline), several kinds of improved curing agents are proposed in Japanese Patent Disclosure SHO No. 50-132096 including alkylenediol-bis(4-aminobenzoates) and the like.

The problem with the alkylenediol-bis(4-aminobenzoates), on the other hand, is that the melting points of these compounds are so high that it is necessary to melt the curing agent beforehand in order to mix it with the prepolymer which should also be preheated at an elevated temperature in order to avoid precipitation of the curing agent during mixing. This necessity for heating of the curing agent and/or the prepolymer is disadvantageous not only due to the cost of heating and lower workability but also due to the danger of frequent degradation of the prepolymer by the prolonged heating at an elevated temperature resulting in inferior qualities of the final products.

Thus there have hitherto been known no curing agents for polyurethane elastomers satisfying all of the above described requirements with respect to the melting point, pot life of the ready-prepared compositions and the properties of the final polyurethane products.

SUMMARY OF THE INVENTION

The object of the present invention is therefore to present a novel curing agent for polyurethane elastomers free from the problems in the prior art and also to provide a method for the preparation of polyurethane elastomers by the use of such curing agent. In particular, the present invention has been completed as a result of the extensive investigations undertaken by the inventors to develop an improved curing agent for polyurethane elastomers with a relatively low melting point and capable of giving sufficiently long pot life to the polyurethane compositions which can be cured into polyurethane elastomers with excellent properties.

Specifically, the present invention relates to a method for the preparation of a polyurethane elastomer in which a polyethyleneglycol-bis(4-aminobenzoate) represented by the general formula

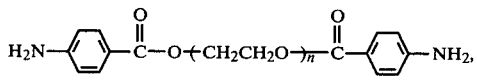

where n is a positive integer from 2 to 4, is used as the curing agent which is reacted with a mixture of a polyisocyanate and a polyol or with a polyisocyanate prepolymer having isocyanate terminal groups at the chain ends to give a polyurethane elastomer.

DETAILED DESCRIPTION OF PREFERRED EMBODIMENTS

The curing agent used in the method of the present invention is a polyethyleneglycol-bis(4-aminobenzoate) represented by the above-given general formula and this compound is obtained readily, for example, by the reaction of 2 moles of 4-nitrobenzoyl chloride and 1 mole of a polyethyleneglycol represented by the general formula $HO-(CH_2CH_2O)_nH$, where n has the same meaning as defined above, to give a polyethyleneglycol-bis(4-nitrobenzoate) which is subjected to reduction with hydrogen and iron or with iron and acetic acid.

The examples of the compounds in conformity with the above general formula in which n is 2, 3 or 4 are diethyleneglycol-bis(4-aminobenzoate) having a melting point of 119°–121.5° C., triethyleneglycol-bis(4-aminobenzoate) having a melting point of 99°–102.5° C. and tetraethyleneglycol-bis(4-aminobenzoate) having a melting point of 64°–67.5° C., respectively.

As is evident from the above, the melting point of the curing agent of the present invention decreases as the number n increases so that a possibility arises of selecting the curing agent with a melting point tailored to the particular need whereby the preheating temperature of the prepolymer can be decreased to avoid thermal degradation of the prepolymer at an excessively high temperature.

Any of the conventional polyisocyanates and polyols used in the art may be employed in the method of the present invention. For example, polyisocyanate compounds are exemplified by hexamethylenediisocyanate (HMDI), cyclohexanediisocyanate, 2,4-tolylenediisocyanate (2,4-TDI), 2,6-tolylenediisocyanate (2,6-TDI), mixtures of 2,4-TDI and 2,6-TDI, dimer and trimer of 2,4-TDI, xylylenediisocyanate (XDI), metaxylylenediisocyanate (MXDI), m-phenylenediisocyanate, 4,4'-biphenyldiisocyanate, diphenylether-4,4'-diisocyanate, 3,3'-ditoluene-4,4'-diisocyanate (TODI), dianisidinediisocyanate (DADI), 4,4'-diphenylmethanediisocyanate (MDI), 3,3'-dimethyl-4,4'-diphenylmethanediisocyanate, 1,5-napthalenediisocyanate (NDI), triphenylmethanetriisocyanate (TTI) and the like.

Similarly, polyol compounds used in the method of the present invention may be any of the conventional ones exemplified by aliphatic polyesterglycols such as polyethylene adipate, polybutylene adipate, polypropylene adipate and the like with extended chain length obtained by the condensation reaction between an aliphatic glycol and a dicarboxylic acid; polyalkyleneether glycols such as polypropyleneether glycol, tetramethyleneether glycol and the like obtained by the ring-opening polymerization of cyclic ethers such as ethylene oxide, propylene oxide, tetrahydrofuran and the like; polyesterglycols obtained by the ring-opening polymerization of $\epsilon$-caprolactone; diol compounds obtained by converting the terminal groups in polybutadienes into hydroxy groups; copolymers of two or more kinds of alkylene oxides; copolymers of two or more kinds of glycols and a dicarboxylic acid; polyester polyols obtained by the co-condensation of a dicarboxylic acid and a polyol such as aromatic glycols, long-chain diols, glycerin, trimethylolpropane and the like; and polyether polyols obtained by the ring-opening polymerization of a cyclic ether such as ethylene oxide, propylene oxide and tetrahydrofuran with a polyol such as glycerin or trimethylolpropane as the initiator.

Further, polyurethane prepolymers having isocyanate terminal groups at the chain ends are prepared by the reaction of the above-mentioned polyol, usually a polyether glycol or polyester glycol, and an excess amount of the above-mentioned polyisocyanate compound and exemplified by those prepolymers prepared with polytetramethylene glycol and an excess amount of a tolylenediisocyanate; with polyethylene adipate and an excess amount of a tolylenediisocyanate; and with polycaprolactonediol and an excess amount of a tolylenediisocyanate.

The conditions for the preparation of the polyurethane elastomer according to the present invention are about the same as in the conventional procedures for the preparation of similar elastomers except for the possibility of decreasing the preheating temperature of the prepolymer and the melting temperature of the curing agent. The method of the present invention may be performed either by the so-called prepolymer process or by the one-shot process using a polyisocyanate and a polyol instead of a prepolymer. In the prepolymer process, the curing agent melted at an elevated temperature of 64°–122° C. according to the value of n in the general formula is admixed with the prepolymer preheated at a temperature at which the curing agent will not solidify during mixing to advantageously effect the curing reaction.

The amount of the curing agent in this case is in the range from 0.8 to 1.2 equivalents or, preferably, from 0.9 to 1.0 equivalent based on the isocyanate groups in the prepolymer. The curing schedule of the thus formulated polyurethane composition depends largely on the types of the prepolymer but it is usually sufficient to heat the mixture at a temperature of 70°–80° C. for about 3-5 hours to complete the curing reaction.

In the method of the present invention, a somewhat longer pot life than in the prior art is readily obtained regardless of the kind of the curing agents so that fabrication of large articles or working in large areas in civil engineering and building construction can be facilitated with the polyurethane compositions prepared according to the invention. Further, the curing agents used in the present invention are not toxic to humans. In addition, those curing agents which are solid at room temperature exhibit remarkable super-cooling so that, once melted, they can be cooled down below their melting points, say to temperatures in the range of 40° to 100° C., as the case may be, or even to about 20° C. without solidifying. Therefore an additional advantage is obtained by blending a super-cooled curing agent in liquid state obtained by gradually cooling the molten curing agent, with a prepolymer kept at a relatively low temperature where no problem arises of thermal degradation of the prepolymer.

Following are the examples to illustrate the present invention in further detail.

In the Examples, the procedures for the measurement of the properties of the cured polyurethane elastomers and the pot life of the ready-prepared compositions were as follows.

The polyurethane prepolymer specified in each of the Examples was admixed with the curing agent melted by heating at its melting point or above with stirring and the mixture was cast into a metal mold of 2 mm thickness preheated at 70° C. and kept for 5 hours at the same temperature or for 3 hours at 80° C. to effect curing. The test specimen obtained by taking out the above cured product from the metal mold with subsequent post-curing for 15 hours in an air oven at 100° C. was subjected to the measurement of the mechanical properties in accordance with the procedure specified in JIS K 6031. The pot life was determined by the time to the disappearance of fluidity of the above prepared mixture of the prepolymer and the curing agent kept in an air oven at 90° C.

PREPARATION 1

[Preparation of diethylene glycol-bis(4-aminobenzoate)]

Into a reaction vessel of 1-liter capacity were taken 40.0 g (0.377 mole) of diethylene glycol, 76.3 g (0.754 mole) of triethylamine and 200 ml of toluene and a solution of 139.9 g (0.754 mole) of 4-nitrobenzoyl chloride in 300 ml of toluene was dropped into the above mixture kept at a temperature of 10° C. or below under agitation over a period of about 15 minutes followed by heating at 60° C. for 3 hours to effect the reaction. The reaction mixture thus obtained was filtered while hot to remove the hydrochloride of triethylamine and subjected to distillation to remove toluene leaving 150.0 g of diethylene glycol-bis(4-nitrobenzoate) having a melting point of 94.0°–96.0° C. The yield was 98.4% of the theoretical based on the diethylene glycol.

Into a reaction vessel of 2-liter capacity were taken 268.0 g (4.80 moles) of powdered iron metal, 5.0 g (0.08 mole) of acetic acid, 268.0 g (14.87 moles) of water and 400 ml of toluene and a solution of 150.0 g (0.37 mole) of the above obtained diethylene glycol-bis(4-nitrobenzoate) in 350 ml of toluene was dropped into the above mixture under reflux with agitation over a period of 1 hour followed by further refluxing for additional 2 hours. The thus obtained reaction mixture was admixed with 6.7 g of sodium hydrogencarbonate to neutralize the acetic acid and filtered while hot to remove the sludge of iron powder and the toluene solution taken by separation on standing from the aqueous phase was subjected to distillation to remove toluene leaving a crystalline product. The crystalline product after recrystallization from an ethyl alcohol solution was light brown in color weighing 90.0 g and had a melting point of 119.0°–121.5° C. to be identified as the objective diethylene glycol-bis(4-aminobenzoate). The yield was 70.6% of the theoretical based on diethylene glycol-bis(4-nitrobenzoate).

PREPARATION 2

[Preparation of triethylene glycol-bis(4-aminobenzoate)]

The procedure for the preparation of triethylene glycol-bis(4-nitrobenzoate) was about the same as in the preparation of diethylene glycol-bis(4-nitrobenzoate) described in Preparation 1 above excepting the use of 56.6 g (0.377 mole) of triethylene glycol in place of 40.0 g (0.377 mole) of diethylene glycol. The product had a melting point of 98.0°–99.5° C. and the yield of 167.5 g correspond to 99.1% of the theoretical based on triethylene glycol.

The reduction of the above obtained triethylene glycol-bis(4-nitrobenzoate) was conducted in the same manner as in Preparation 1 excepting the use of 165.9 g (0.37 mole) of triethylene glycol-bis(4-nitrobenzoate) in place of 150.0 g (0.37 mole) of diethylene glycol-bis(4-nitrobenzoate). The product thus obtained was a white powder having a melting point of 99.0°–102.5° C. and identified to be triethylene glycol-bis(4-aminobenzoate). The yield of 102.0 g corresponded to 71.0% of the theoretical based on triethylene glycol-bis(4-nitrobenzoate).

PREPARATION 3

[Preparation of tetraethylene glycol-bis(4-aminobenzoate)]

The procedure for the preparation of tetraethylene glycol-bis(4-nitrobenzoate) was about the same as in the preparation of diethylene glycol-bis(4-nitrobenzoate) described in Preparation 1 above excepting the use of 73.2 g (0.377 mole) of tetraethylene glycol in place of 40.0 g (0.377 mole) of diethylene glycol. The product had a melting point of 49.0°–52.0° C. and the yield of 182.8 g corresponded to 98.5% of the theoretical based on tetraethylene glycol.

The reduction of the thus obtained tetraethylene glycol-bis(4-nitrobenzoate) was conducted in the same manner as in Preparation 1 excepting the use of 182.2 g (0.37 mole ) of tetraethylene glycol-bis(4-nitrobenzoate) in place of 150.0 g (0.37 mole) of diethylene glycol-bis(4-nitrobenzoate). The product thus obtained was a light brown powder having a melting point of 64.0°–67.5° C. and was identified to be tetraethylene glycol-bis(4-aminobenzoate). The yield of 113.3 g correspond to 70.8% of the theoretical based on tetraethylene glycol-bis(4-nitrobenzoate).

EXAMPLE 1 (Experiments No. 1 to No. 5)

Either one of the curing agents di-, tri- and tetra-ethylene glycol-bis(4-aminobenzoates) (Experiments Nos. 1, 2 and 3, respectively) prepared in the above Preparations 1, 2 and 3, respectively, in an amount indicated in Table 1 below was melted at 130° C. and blended with 100 g of a polyurethane prepolymer Adiprene L-100 (product of E. I. DuPont de Nemours Co.) having a content of isocyanate groups of 4.19% by weight preheated at 80° C. with stirring and the mixture was cast and cured in the manner as described before with the curing schedule of 5 hours at 70° C.

The pot life of the ready-prepared mixture and the mechanical properties of the cured polyurethane elastomer were as set out in Table 1.

For comparison, similar experiments were undertaken with conventional 4,4'-methylene-bis(2-chloroaniline) (Experiment No. 4) and 1,3-propanediol-bis(4-aminobenzoate) (Experiment No. 5) and the results are set out in Table 1.

TABLE 1

| Experiment No. | 1 | 2 | 3 | 4 | 5 |
|---|---|---|---|---|---|
| Curing agent taken, g | 16.3 | 18.4 | 20.5 | 12.7 | 14.2 |
| Pot life, minutes | 20 | 22 | 30 | 15 | 30 |
| Hardness (JIS, type A) | 90 | 89 | 90 | 88 | 89 |
| Tensile strength, kg/cm$^2$ | 460 | 565 | 321 | 438 | 413 |
| Ultimate elongation, % | 660 | 610 | 670 | 440 | 530 |
| Tear strength, kg/cm | 105 | 93 | 102 | 95 | 97 |
| Elastic resilience, % | 52 | 55 | 57 | 54 | 51 |

EXAMPLE 2

(Experiments No. 6 to No. 10)

Polyurethane prepolymer compositions were prepared by admixing at 80° C. either one of the melted curing agents di-, tri- and tetraethylene glycol-bis(4-aminobenzoates) prepared in Preparations 1, 2 and 3 above (Experiments Nos. 6, 7 and 8, respectively), 1,3-propanediol-bis(4-aminobenzoate) (Experiment No. 9) and 4,4'-methylene-bis(2-chloroaniline) (Experiment No. 10) in amounts as indicated in Table 2 below with 100 g of a prepolymer Cyanaprene A-8 (product of American Cyanamid Co.) prepared by the reaction of polyethylene adipate and a tolylenediisocyanate with a content of isocyanate groups of 3.1% by weight and the mixtures were cast and cured in the manner as described before with the curing schedule of 3 hours at 80° C.

The pot life of the ready-prepared compositions and the mechanical properties of the cured polyurethane elastomers are set out in Table 2.

TABLE 2

| Experiment No. | 6 | 7 | 8 | 9 | 10 |
|---|---|---|---|---|---|
| Curing agent taken, g | 11.4 | 12.9 | 14.3 | 10.4 | 8.9 |
| Pot life, minutes | 17 | 20 | 22 | 20 | 13 |
| Hardness (JIS, type A) | 82 | 81 | 81 | 81 | 79 |
| Tensile strength, kg/cm$^2$ | 593 | 564 | 531 | 521 | 418 |
| Ultimate elongation, % | 850 | 830 | 810 | 810 | 650 |
| Tear strength, kg/cm | 85 | 81 | 79 | 79 | 76 |
| Elastic resilience, % | 42 | 42 | 43 | 40 | 41 |

EXAMPLE 3

(Experiments No. 11 to No. 15)

The same experimental procedures were repeated as in Example 2 by use of the same curing agents di-, tri- and tetraethylene glycol-bis(4-aminobenzoates) (Experiments Nos. 11, 12 and 13, respectively), and two kinds of the same comparative curing agents 1,3-propanediolbis(4-aminobenzoate) and 4,4'-methylenebis(2-chloroaniline) (Experiments No. 14 and No. 15, respectively) except that the polyurethane prepolymer in this case was Pandex 305E (product of Dainippon Ink Kagaku Co.) prepared by the reaction of polycaprolactonediol and a tolylenediisocyanate with a content of the isocyanate groups of 5.2% by weight instead of Cyanaprene A-8. The results are set out in Table 3.

TABLE 3

| Experiment No. | 11 | 12 | 13 | 14 | 15 |
|---|---|---|---|---|---|
| Curing agent taken, g | 19.2 | 21.6 | 24.1 | 17.5 | 14.9 |
| Pot life, minutes | 10 | 12 | 13 | 10 | 6 |
| Hardness (JIS, type A) | 91 | 91 | 90 | 90 | 87 |
| Tensile strength, kg/cm$^2$ | 511 | 493 | 459 | 470 | 424 |
| Ultimate elongation, % | 700 | 690 | 650 | 640 | 460 |
| Tear strength, kg/cm | 95 | 95 | 89 | 91 | 87 |
| Elastic resilience, % | 35 | 34 | 31 | 32 | 29 |

What is claimed is:

1. A method for the preparation of a polyurethane elastomer which comprises admixing a polyethylene glycol-bis(4-aminobenzoate) represented by the general formula

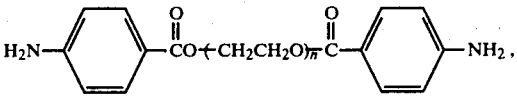

wherein n is 2, 3 or 4, with a polyisocyanate and a polyol or with a prepolymer having isocyanate groups at the chain ends.

2. The method as claimed in claim 1 wherein the number n in the general formula is 2.

3. The method as claimed in claim 1 wherein the polyethylene glycol-bis(4-aminobenzoate) is admixed with the prepolymer having isocyanate groups at the chain ends in an amount in the range from 0.8 to 1.2 equivalents based on the isocyanate groups in the prepolymer.

4. The method as claimed in claim 1 wherein the polyethylene glycol-bis(4-aminobenzoate) is admixed while in a super-cooled liquid state with the prepolymer having isocyanate groups at the chain ends.

* * * * *